US012700062B2

(12) United States Patent
Zhao et al.

(10) Patent No.: US 12,700,062 B2
(45) Date of Patent: Aug. 4, 2026

(54) IMAGE PROCESSING METHOD AND DEVICE

(71) Applicant: Beijing Bytedance Network Technology Co., Ltd., Beijing (CN)

(72) Inventors: Tu Zhao, Beijing (CN); Gengxiang Zhang, Beijing (CN); Yi Gan, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 278 days.

(21) Appl. No.: 18/570,058

(22) PCT Filed: Aug. 17, 2022

(86) PCT No.: PCT/CN2022/113117
§ 371 (c)(1),
(2) Date: Dec. 13, 2023

(87) PCT Pub. No.: WO2023/040563
PCT Pub. Date: Mar. 23, 2023

(65) Prior Publication Data

US 2024/0273673 A1      Aug. 15, 2024

(30) Foreign Application Priority Data

Sep. 18, 2021     (CN) .......................... 202111101796.6

(51) Int. Cl.
*G06T 3/4053*        (2024.01)
*G06T 5/20*          (2006.01)
*G06V 10/764*        (2022.01)

(52) U.S. Cl.
CPC .............. *G06T 3/4053* (2013.01); *G06T 5/20* (2013.01); *G06V 10/764* (2022.01)

(58) Field of Classification Search
CPC ..................... G06T 3/4053; G06T 5/20; G06T 2207/10016; G06T 2207/20081; G06V 10/764
See application file for complete search history.

(56) References Cited

U.S. PATENT DOCUMENTS 11,373,274 B1 * 6/2022 Yoon ..................... G06T 3/4053
2010/0134496 A1 * 6/2010 Bhaskaran .............. G06T 3/403
345/428

(Continued)

FOREIGN PATENT DOCUMENTS

CN          107527321 A  * 12/2017  ........... G06T 3/4053
CN          108765343 A  * 11/2018  ............... G06T 5/50

(Continued)

OTHER PUBLICATIONS

Written Opinion for International Application No. PCT/CN2022/113117, mailed Nov. 17, 2022, 9 Pages.

(Continued)

*Primary Examiner* — Henok Shiferaw
*Assistant Examiner* — Woo C Rhim
(74) *Attorney, Agent, or Firm* — BakerHostetler

(57)          ABSTRACT

Embodiments of the present disclosure provide an image processing method, device and apparatus, an electronic device, a computer-readable storage medium, a computer program product, and a computer program. The method comprises: obtaining a hash value of a pixel of a low-resolution image; finding a filter bank corresponding to the hash value; respectively filtering the regions corresponding to the pixels in the low-resolution image according to multiple filters in the filter bank such that each filter outputs a filtered pixel value; and writing each filtered pixel value into a corresponding coordinate position of a high-resolution image, thereby realizing super-resolution processing of the image and obtaining a high-resolution image. In the present (Continued)

disclosure, since the pixels in the low-resolution image are filtered, the number of pixels filtered is lower, and the processing efficiency is significantly improved.

17 Claims, 7 Drawing Sheets

(56)                    References Cited

U.S. PATENT DOCUMENTS

| | | | | |
|---|---|---|---|---|
| 2017/0206632 | A1* | 7/2017 | Milanfar | G06T 5/73 |
| 2018/0322614 | A1* | 11/2018 | Petrova | G06T 7/246 |
| 2021/0012464 | A1* | 1/2021 | Yang | G06T 7/44 |
| 2021/0104018 | A1* | 4/2021 | Moon | G06T 3/4053 |
| 2022/0237741 | A1* | 7/2022 | Yin | H04N 19/117 |
| 2022/0239908 | A1* | 7/2022 | Meng | H04N 19/86 |
| 2022/0270207 | A1* | 8/2022 | Chen | G06N 3/084 |
| 2024/0273673 | A1* | 8/2024 | Zhao | G06T 3/4053 |

FOREIGN PATENT DOCUMENTS

| | | | | | |
|---|---|---|---|---|---|
| CN | 110070486 | A | * | 7/2019 | G06T 3/4053 |
| CN | 111445424 | A | * | 7/2020 | G06T 5/30 |
| CN | 111783896 | A | | 10/2020 | |
| CN | 111951167 | A | * | 11/2020 | G06T 3/4007 |
| CN | 113808020 | A | | 12/2021 | |
| EP | 2927864 | A1 | * | 10/2015 | G06T 3/4053 |
| WO | WO-2020000877 | A1 | * | 1/2020 | G06T 5/00 |
| WO | WO-2021102644 | A1 | * | 6/2021 | G06T 5/10 |

OTHER PUBLICATIONS

International Patent Application No. PCT/CN2022/113117; Int'l Search Report; dated Nov. 17, 2022; 2 pages.
Yang Fan; "Digital image processing and analysis"; Beijing: Beihang University Press; May 2015; p. 10-12; (contains English Abstract).
Rejection Decision for Chinese Application No. 202111101796.6, mailed Nov. 8, 2024, 12 Pages.

* cited by examiner

101

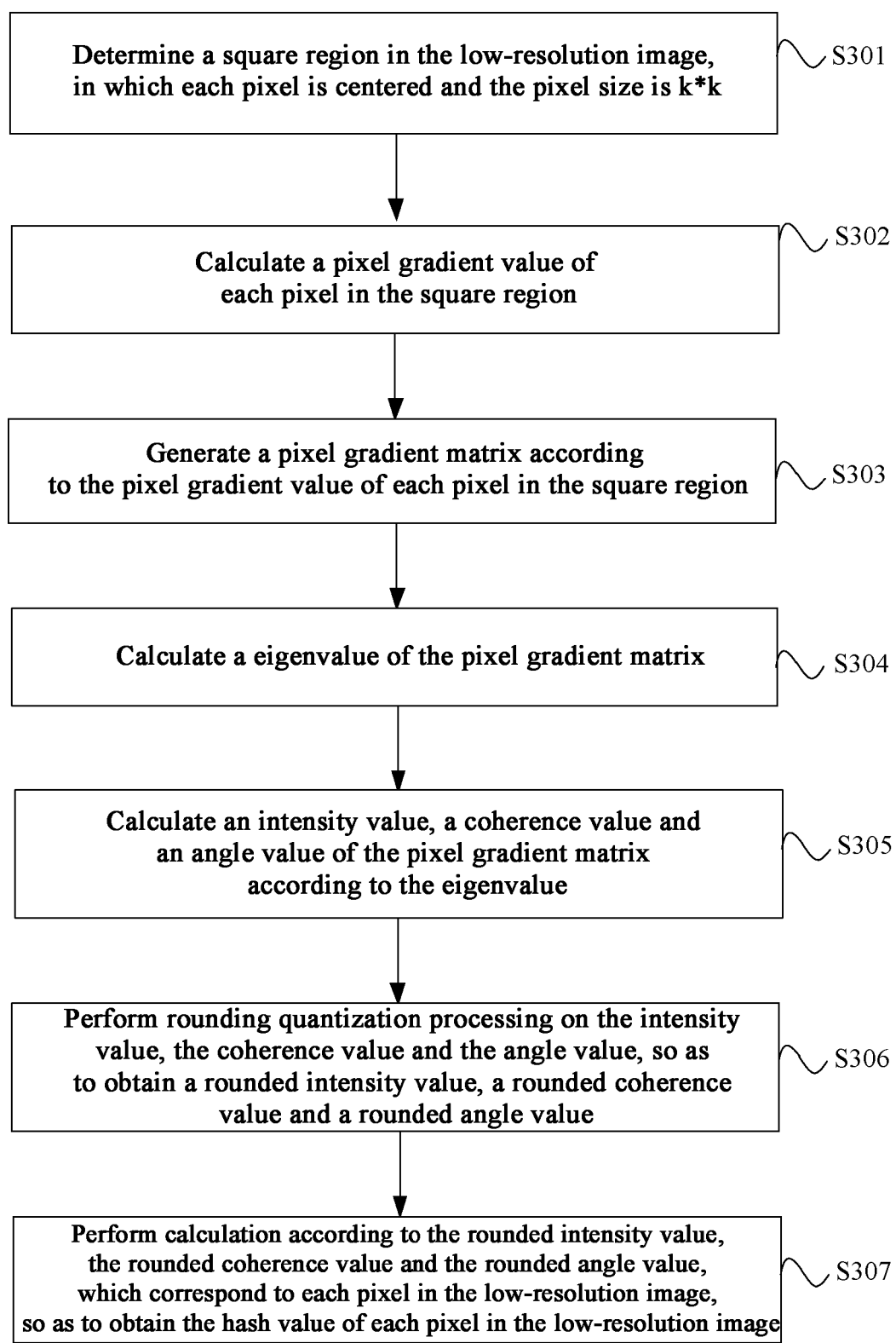

Determine a square region in the low-resolution image, in which each pixel is centered and the pixel size is k*k    S301

Calculate a pixel gradient value of each pixel in the square region    S302

Generate a pixel gradient matrix according to the pixel gradient value of each pixel in the square region    S303

Calculate a eigenvalue of the pixel gradient matrix    S304

Calculate an intensity value, a coherence value and an angle value of the pixel gradient matrix according to the eigenvalue    S305

Perform rounding quantization processing on the intensity value, the coherence value and the angle value, so as to obtain a rounded intensity value, a rounded coherence value and a rounded angle value    S306

Perform calculation according to the rounded intensity value, the rounded coherence value and the rounded angle value, which correspond to each pixel in the low-resolution image, so as to obtain the hash value of each pixel in the low-resolution image    S307

FIG. 3

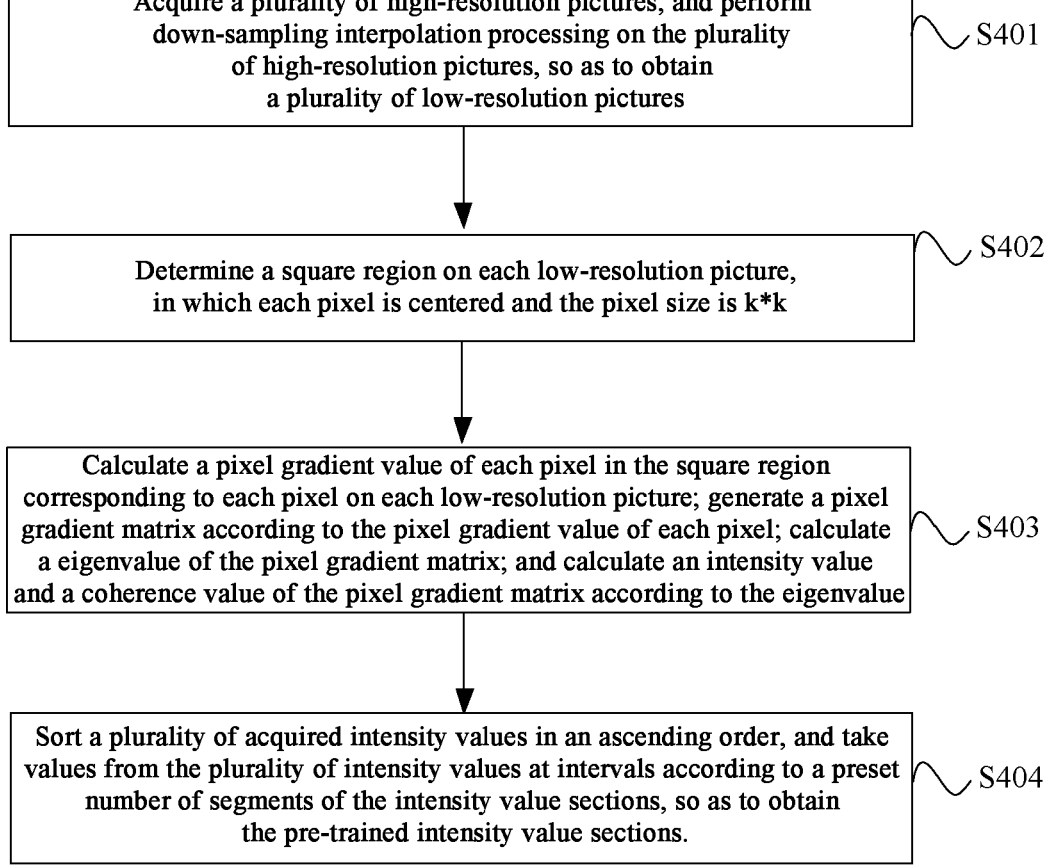

Acquire a plurality of high-resolution pictures, and perform down-sampling interpolation processing on the plurality of high-resolution pictures, so as to obtain a plurality of low-resolution pictures — S401

Determine a square region on each low-resolution picture, in which each pixel is centered and the pixel size is k*k — S402

Calculate a pixel gradient value of each pixel in the square region corresponding to each pixel on each low-resolution picture; generate a pixel gradient matrix according to the pixel gradient value of each pixel; calculate a eigenvalue of the pixel gradient matrix; and calculate an intensity value and a coherence value of the pixel gradient matrix according to the eigenvalue — S403

Sort a plurality of acquired intensity values in an ascending order, and take values from the plurality of intensity values at intervals according to a preset number of segments of the intensity value sections, so as to obtain the pre-trained intensity value sections. — S404

FIG. 4

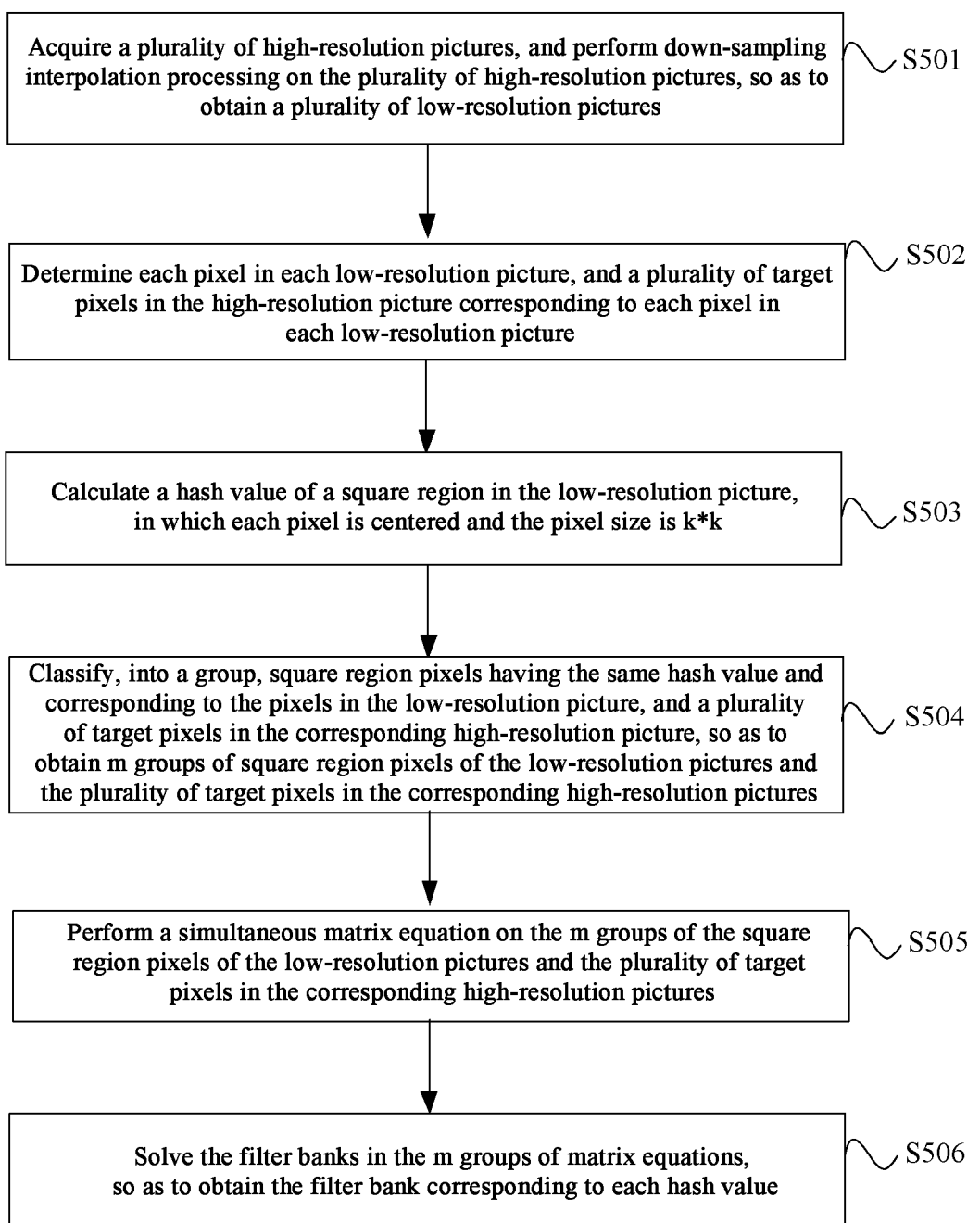

Acquire a plurality of high-resolution pictures, and perform down-sampling interpolation processing on the plurality of high-resolution pictures, so as to obtain a plurality of low-resolution pictures      S501

Determine each pixel in each low-resolution picture, and a plurality of target pixels in the high-resolution picture corresponding to each pixel in each low-resolution picture      S502

Calculate a hash value of a square region in the low-resolution picture, in which each pixel is centered and the pixel size is k*k      S503

Classify, into a group, square region pixels having the same hash value and corresponding to the pixels in the low-resolution picture, and a plurality of target pixels in the corresponding high-resolution picture, so as to obtain m groups of square region pixels of the low-resolution pictures and the plurality of target pixels in the corresponding high-resolution pictures      S504

Perform a simultaneous matrix equation on the m groups of the square region pixels of the low-resolution pictures and the plurality of target pixels in the corresponding high-resolution pictures      S505

Solve the filter banks in the m groups of matrix equations, so as to obtain the filter bank corresponding to each hash value      S506

FIG. 5

IMAGE PROCESSING METHOD AND DEVICE

CROSS-REFERENCE TO RELATED APPLICATION(S)

This application is a U.S. National Stage Application of PCT Application Serial No. PCT/CN2022/113117, filed Aug. 17, 2022, which claims priority to Chinese Application No. 202111101796.6, filed in the China Patent Office on Sep. 18, 2021, and entitled "Image Processing Method and Device", the disclosures of which is are incorporated herein by reference in their entireties.

FIELD

Embodiments of the present disclosure relate to the technical field of computers and network communications, and in particular, to an image processing method, device and apparatus, an electronic device, a computer-readable storage medium, a computer program product, and a computer program.

BACKGROUND

During the processes of video conferences, live video streaming, network course teaching and the like, when the network bandwidth of a user is reduced, in order to ensure that a video picture is not stuck, the resolution of the video is reduced, but the display effect of a video image is influenced at the same time. Therefore, it is necessary to improve the image resolution of each frame in the video, that is, perform super-resolution image processing.

At present, the most commonly used super-resolution image processing method includes: performing up-sampling amplification on a low-resolution image, calculating a hash value of a pixel of an amplified image, finding a corresponding pre-trained filter according to the hash value, filtering the pixel according to the filter, and then performing the above processing on each pixel in the amplified image, so as to finally obtain a high-resolution image.

However, in this method, since filtering is performed on the image subjected to up-sampling amplification, and the image includes many pixels, so that the processing speed is relatively low.

SUMMARY

Embodiments of the present disclosure provide an image processing method, device and apparatus, an electronic device, a computer-readable storage medium, a computer program product, and a computer program, so as to overcome the problem in the prior art that an image subjected to up-sampling amplification needs to be filtered and the image includes many pixels, resulting in a relatively low processing speed.

In a first aspect, an embodiment of the present disclosure provides an image processing method, including:

acquiring a low-resolution image, and calculating a hash value of each pixel in the low-resolution image;

querying pre-stored correspondences between hash values and pre-trained filter banks, so as to obtain a filter bank corresponding to the hash value of each pixel, wherein the filter bank includes a plurality of filters;

respectively filtering a pixel region corresponding to each pixel according to each filter in the filter bank, so as to obtain a plurality of filtered pixel values; and respectively writing the plurality of filtered pixel values into corresponding coordinate positions of a high-resolution image, so as to obtain the high-resolution image corresponding to the low-resolution image.

In a second aspect, an embodiment of the present disclosure provides an image processing unit, including:

a hash value determining module, configured to acquire a low-resolution image, and calculate a hash value of each pixel in the low-resolution image;

a filter determining module, configured to query pre-stored correspondences between hash values and pre-trained filter banks, so as to obtain a filter bank corresponding to the hash value of each pixel, wherein the filter bank includes a plurality of filters;

a filtering processing module, configured to respectively filter a pixel region corresponding to each pixel according to each filter in the filter bank, so as to obtain a plurality of filtered pixel values; and a pixel writing module, configured to respectively write the plurality of filtered pixel values into corresponding coordinate positions of a high-resolution image, so as to obtain the high-resolution image corresponding to the low-resolution image.

In a third aspect, an embodiment of the present disclosure provides an electronic device, including: a processor and a memory;

the memory stores a computer execution instruction; and the processor executes the computer execution instruction stored in the memory, so that the at least one processor implements the image processing method in the first aspect and various possible designs of the first aspect.

In a fourth aspect, an embodiment of the present disclosure provides a computer-readable storage medium, wherein a computer execution instruction is stored in the computer-readable storage medium, and when executing the computer execution instruction, a processor implements the image processing method in the first aspect and various possible designs of the first aspect.

In a fifth aspect, an embodiment of the present disclosure provides a computer program product, including a computer program, wherein when executed by a processor, the computer program implements the image processing method in the first aspect and various possible designs of the first aspect.

In a sixth aspect, an embodiment of the present disclosure provides a computer program, wherein when executed by a processor, the computer program implements the image processing method in the first aspect and various possible designs of the first aspect.

According to the image processing method, device and apparatus, the electronic device, the computer-readable storage medium, the computer program product and the computer program provided in the present embodiment, by means of acquiring the hash values of the pixels of the low-resolution image, querying the corresponding filter bank according to the hash values, respectively filtering corresponding regions of the pixels of the low-resolution image according to the plurality of filters in the filter bank, so that each filter outputs a filtered pixel value, and writing the filtered pixel values into the corresponding coordinate positions of the high-resolution image, super-resolution processing of the image is realized, and the high-resolution image is obtained. Firstly, since the pixels in the low-resolution image are filtered, compared with the prior art in which an image subjected to up-sampling filtering is filtered, the number of filtered pixels in the present embodiment is small, so that the processing efficiency is greatly improved;

and secondly, in the prior art, there is a need to read a cached filter from a memory at a time, such that the memory needs to be frequently accessed, resulting in a slow response speed, while in the present embodiment, a filter bank consisting of a plurality of continuously stored filters is read from the memory at a time, such that the memory does not need to be frequently accessed, thereby improving the response speed.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

FIG. 3 is a second schematic flowchart of an image processing method provided in an embodiment of the present disclosure;

FIG. 4 is a third schematic flowchart of an image processing method provided in an embodiment of the present disclosure;

FIG. 5 is a fourth schematic flowchart of an image processing method provided in an embodiment of the present disclosure;

DETAILED DESCRIPTION OF EMBODIMENTS

Figure 1:
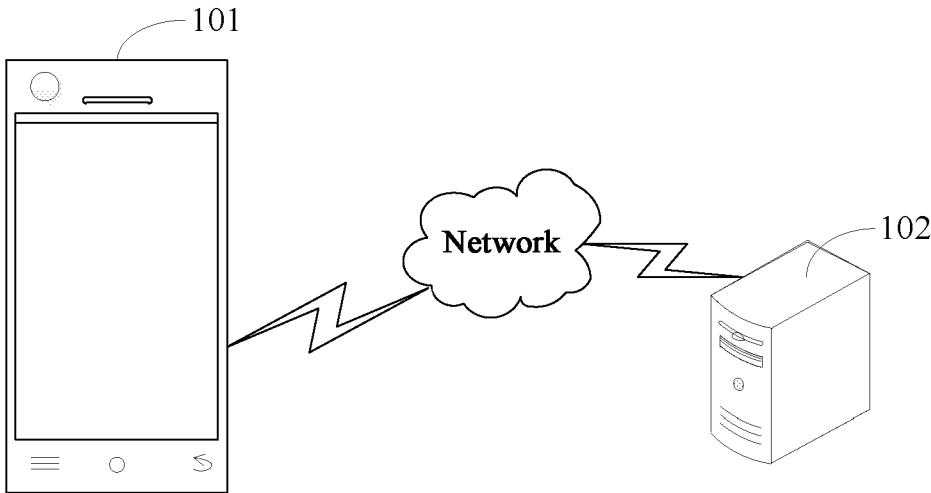
FIG. 1 is a schematic diagram of an image processing scenario provided in an embodiment of the present disclosure.

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

During the processes of video conferences, live video streaming, network course teaching and the like, when the network bandwidth of a user is reduced, in order to ensure that a video picture is not stuck, the resolution of the video is reduced, but the display effect of the video picture is affected. In order to improve the display effect of the video picture, the image resolution of each frame in the video may be improved by using an up-sampling algorithm at this time. The conventional up-sampling algorithm includes bilinear interpolation or trilinear interpolation, but the two conventional up-sampling algorithms may cause the loss of high-frequency information in a video image, so that the video image becomes blurred. In order to solve this problem, a plurality of super-resolution algorithms have been proposed to process the video image, so as to improve the problem of blurring of up-sampled pictures. Firstly, some one proposes a method based on deep learning, that is, a low-resolution image is directly input into a deep learning model for up-sampling, so as to obtain a high-resolution image, although this method may improve the picture effect, the speed is relatively slow, and even a graphics processing unit (GPU for short) needs to be used for acceleration, such that the cost is relatively high. Secondly, some people propose to use an image sharpening processing method to perform high-frequency information enhancement processing on the low-resolution image, although an image picture processed by this method is relatively sharp, the details of the image picture are not rich enough, and the sharpening effect is unbalanced. Therefore, the above two modes are not widely applied. At present, the most commonly used super-resolution image processing method includes: performing up-sampling amplification on a low-resolution image, calculating a hash value of a pixel of an amplified image, finding a corresponding pre-trained filter according to the hash value, and filtering the pixel according to the filter to obtain a high-resolution image. However, in this method, since the image subjected to up-sampling amplification is filtered, and the image has many pixels, so that the processing speed is relatively low.

In order to solve the above technical problems, the present disclosure provides the following technical solutions: acquiring hash values of pixels of a low-resolution image, querying a corresponding filter bank according to the hash values, respectively filtering corresponding regions of the pixels of the low-resolution image according to a plurality of filters in the filter bank, so that each filter outputs a filtered pixel value, and writing the filtered pixel values into corresponding coordinate positions of a high-resolution image, thereby realizing super-resolution processing of the image and obtaining the high-resolution image. Since the pixels in the low-resolution image are filtered, the number of filtered pixels is small, and thus the processing efficiency is significantly improved.

Referring to FIG. 1, FIG. 1 is a schematic diagram of an image processing scenario provided in an embodiment of the present disclosure. As shown in FIG. 1, the image processing scenario includes a terminal 101 and a server 102, wherein the terminal 101 may be any form of terminal device, and the terminal device involved in the present disclosure may be a wireless terminal or a wired terminal. The wireless terminal may refer to a device which provides voice and/or other service data connectivity for a user, a handheld device having a wireless connection function, or other processing devices connected to a wireless modem. The wireless terminal may communicate with one or more core network devices via a radio access network (RAN for short), and the wireless terminal may be a mobile terminal, such as a mobile phone (or referred to as a "cellular" phone) and a computer with a mobile terminal, for example, may be a portable, pocket, handheld, computer built-in or vehicle-mounted mobile apparatus, which exchanges language and/or data with the radio access network. As another example, the wireless terminal may also be a device such as a personal communication service (PCS for short) phone, a cordless telephone, a session initiation protocol (SIP) phone, a wireless local loop (WLL for short) station, a personal digital assistant (PDA for short), and the like. The wireless terminal may also be referred to as a system, a subscriber unit, a subscriber station, a mobile station, a mobile, a remote station, a remote terminal, an access terminal, a user terminal, a user agent, or a user device, which is not limited herein. Optionally, the terminal device may also be a terminal device such as a mobile phone, a smart wearable device, a tablet computer, etc.

The server 102 may be a cluster composed of one or more servers, the server may communicate with the terminal through a network, and the server may provide various communication data for the terminal 101.

Figure 2:
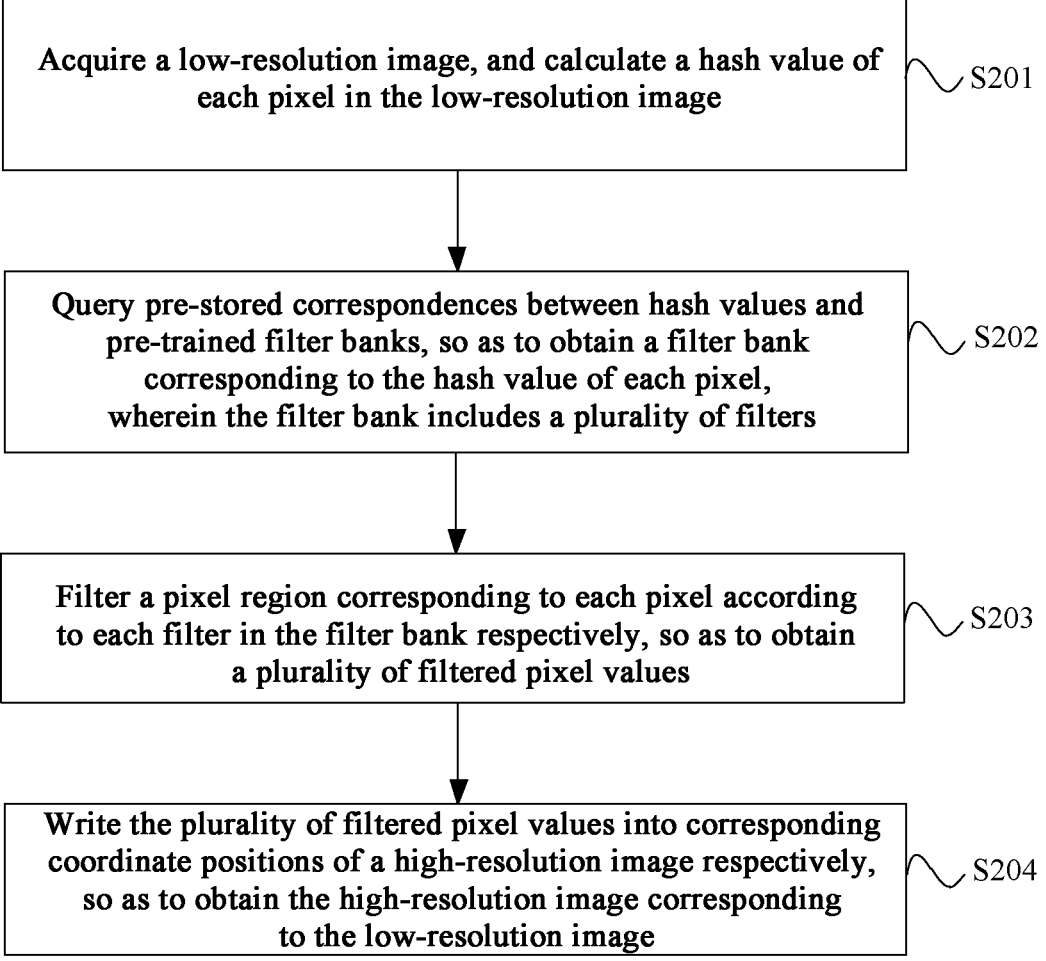
FIG. 2 is a first schematic flowchart of an image processing method provided in an embodiment of the present disclosure.

Referring to FIG. 2, FIG. 2 is a first schematic flowchart of an image processing method provided in an embodiment of the present disclosure. The method in the present embodiment may be applied to the terminal or the server as shown in FIG. 1, which is not limited in the present disclosure, and the image processing method includes:

S201: acquiring a low-resolution image, and calculating a hash value of each pixel in the low-resolution image.

In the present embodiment, the low-resolution image may be an image, which is generated after the resolution of a video is reduced in the case of a network bandwidth decrease of the user during the processes of video conferences, live video streaming, network course teaching and the like.

Specifically, a plurality of pixel values in a corresponding region where any pixel in the low-resolution image is located are determined, and the hash value of the region is calculated according to the plurality of pixel values in the region, that is, the hash value corresponding to any pixel in the low-resolution image.

S202: querying pre-stored correspondences between hash values and pre-trained filter banks, so as to obtain a filter bank corresponding to the hash value of each pixel, wherein the filter bank includes a plurality of filters.

In the present embodiment, the correspondences between the hash values and the pre-trained filter banks is stored locally in advance, and the storage format of the pre-stored correspondences between the hash values and the pre-trained filter banks may be a table format or a database format, etc.

The pre-stored correspondences between the hash values and the pre-trained filter banks includes a filter bank consisting of a plurality of pre-trained filters corresponding to different hash values.

Specifically, the pre-trained filter banks corresponding to different hash values are obtained in the following manner: performing down-sampling processing according to a large number of high-resolution pictures, so as to obtain a large number of low-resolution pictures; and then, using the large number of high-resolution pictures and the corresponding low-resolution pictures as training data sets, and using the low-resolution pictures as input and the high-resolution pictures as output to perform equation solving on the filter banks, so as to obtain the filter banks corresponding to different hash values.

S203: respectively filtering a pixel region corresponding to each pixel according to each filter in the filter bank, so as to obtain a plurality of filtered pixel values.

In the present embodiment, the number of filters included in the filter bank is the same as the number of pixels at corresponding coordinate positions of a high-resolution image. Here, the multiple of up-sampling from the low-resolution image to the high-resolution image is s multiples, then the number of filters in the filter bank is $s^2$, and the number of pixels at the corresponding coordinate positions of the corresponding high-resolution image is also $s^2$ wherein s is a positive integer.

The size of each filter is the same as the size of the pixel region corresponding to each pixel. For example, the size of each filter is k\*k, and the size of the pixel region corresponding to each pixel is also k\*k, wherein k represents the number of pixels.

S204: respectively writing the plurality of filtered pixel values into corresponding coordinate positions of the high-resolution image, so as to obtain the high-resolution image corresponding to the low-resolution image.

In the present embodiment, the multiple of up-sampling from the low-resolution image to the high-resolution image is s multiples, then the number of filters in the filter bank is $s^2$, the coordinates corresponding to any pixel in the low-resolution image are defined as (x, y), then the corresponding coordinate positions of the high-resolution image is a square region from (sx, sy) to (sx+s−1, sy+s−1), there are $s^2$ pixel positions in this region in total, and $s^2$ obtained filter pixel values are respectively written into the $s^2$ pixel positions.

As can be seen from the above description, by means of acquiring the hash values of the pixels of the low-resolution image, querying the corresponding filter bank according to the hash values, respectively filtering corresponding regions of the pixels of the low-resolution image according to the plurality of filters in the filter bank, so that each filter outputs a filtered pixel value, and writing the filtered pixel values into the corresponding coordinate positions of the high-resolution image, therefore super-resolution processing of the image is realized, and the high-resolution image is obtained. Firstly, since the pixels in the low-resolution image are filtered, compared with the prior art in which an image subjected to up-sampling filtering is filtered, the number of filtered pixels in the present embodiment is small, so that the processing efficiency is greatly improved; and secondly, in the prior art, there is a need to read a cached filter from a memory at a time, such that the memory needs to be frequently accessed, resulting in a slow response speed, while in the present embodiment, a filter bank consisting of a plurality of continuously stored filters is read from the memory at a time, such that the memory does not need to be frequently accessed, thereby improving the response speed.

Referring to FIG. 3, FIG. 3 is a second schematic flowchart of an image processing method provided in an embodiment of the present disclosure. On the basis of the above embodiment, the above step S201 specifically includes:

S301: determining a square region in the low-resolution image, in which each pixel is centered and the pixel size is k\*k, wherein k is an odd number greater than 1.

In the present embodiment, for each pixel in the low-resolution image, the corresponding square region with the pixel size of k\*k is determined.

Here, k is an odd number greater than 1. Optionally, the value of k is 3 or 5.

S302: calculating a pixel gradient value of each pixel in the square region.

Specifically, a first pixel gradient in the horizontal direction of each pixel in the square region and a second pixel gradient in the vertical direction are respectively calculated.

In the present embodiment, calculating the first pixel gradient in the horizontal direction includes: subtracting the pixel value of the current pixel from the pixel value of a right pixel adjacent to the current pixel; and calculating the second pixel gradient in the vertical direction includes: subtracting the pixel value of the current pixel from the pixel value of a lower pixel adjacent to the current pixel. The specific calculation formulas are as follows:

$$g_x = I(i+1, j) - I(i, j)$$

$$g_y = I(i, j+1) - I(i, j)$$

In the formulas, $g_x$ represents the first pixel gradient, and $g_x$ represents the second pixel gradient; and I(i,j) represents the pixel value of the current pixel, and i,j are coordinates.

S303: generating a pixel gradient matrix according to the pixel gradient value of each pixel in the square region.

Specifically, a 2*2 pixel gradient matrix is constructed according to the pixel gradient value of each pixel in the square region, wherein the first element in the 2*2 pixel gradient matrix is equal to the quadratic sum of the first pixel gradients of the pixels in the horizontal direction, the second element and the third element are equal to the sum of products of the first pixel gradients of the pixels in the horizontal direction and the second pixel gradients in the vertical direction, and the fourth element is equal to the quadratic sum of the second pixel gradients of the pixels in the vertical direction.

In the present embodiment, a 2*2 pixel gradient matrix is generated according to the pixel gradient value of each pixel in the k*k square region, and the four elements in this matrix are shown as follows:

$$\left\{ \begin{matrix} \sum_0^{k^2} g_x^2 & \sum_0^{k^2} g_x g_y \\ \sum_0^{k^2} g_x g_y & \sum_0^{k^2} g_y^2 \end{matrix} \right\}$$

wherein, $$\sum_0^{k^2} g_x^2$$

represents the first element, $$\sum_0^{k^2} g_x g_y$$

represents the second element and the third element, and $$\sum_0^{k^2} g_y^2$$

represents the fourth element.

S304: calculating an eigenvalue of the pixel gradient matrix.

Specifically, the eigenvalue of the 2*2 pixel gradient matrix is calculated to obtain a first eigenvalue and a second eigenvalue of the 2*2 pixel gradient matrix.

In the present embodiment, the eigenvalue of the 2*2 pixel gradient matrix is calculated to obtain two eigenvalues, wherein the first eigenvalue is denoted as $\lambda_1$, and the second eigenvalue is denoted as $\lambda_2$.

S305: calculating an intensity value, a coherence value and an angle value of the pixel gradient matrix according to the eigenvalue.

Specifically, the intensity value is calculated according to the first eigenvalue; the coherence value is calculated according to the first eigenvalue and the second eigenvalue;

and an eigenvector corresponding to the first eigenvalue is calculated, and the angle value is calculated according to the eigenvector.

In the present embodiment, the formula for calculating the intensity value according to the first eigenvalue is as follows:

$$str = \lambda_1$$

In the formula, str represents the intensity value.

In the present embodiment, the formula for calculating the coherence value according to the first eigenvalue and the second eigenvalue is as follows:

$$coh = \frac{\sqrt{\lambda_1} - \sqrt{\lambda_2}}{\sqrt{\lambda_1} + \sqrt{\lambda_2}}$$

In the formula, coh represents the coherence value.

In the present embodiment, the eigenvector corresponding to the first eigenvalue is calculated, and the eigenvector corresponding to $\lambda_1$ is denoted as $$\begin{pmatrix} v_1 \\ v_2 \end{pmatrix},$$

and then, the formula for calculating the angle value according to the eigenvector is as follows:

$$ang = non\_linear\_func\left(\frac{v_2}{v_1}\right)$$

In the formula, ang represents the angle value, and non_linear_func refers to performing nonlinear mapping calculation.

S306: performing rounding quantization processing on the intensity value, the coherence value and the angle value, so as to obtain a rounded intensity value, a rounded coherence value and a rounded angle value.

Specifically, the rounded intensity value corresponding to the intensity value is determined according to the intensity value, pre-trained intensity value sections, and the number of segments of the intensity value sections; the rounded coherence value corresponding to the coherence value is determined according to the coherence value, pre-trained coherence value sections, and the number of segments of the coherence value sections; and the rounded angle value corresponding to the angle value is determined according to the angle value and the number of segments of the angle value.

In the present embodiment, the calculation formula for determining the rounded intensity value corresponding to the intensity value according to the intensity value, the pre-trained intensity value sections and the number of segments of the intensity value sections is as follows:

$$\text{lambda} = \begin{cases} 0, & str < str_1 \\ 1, & str_1 < str < str_2 \\ & \cdot \\ & \cdot \\ & \cdot \\ Q - 1, & str > str_{q-1} \end{cases}$$

In the formula, lambda represents the rounded intensity value, $str_1$, $str_2$, . . . $str_{q-1}$ represents the pre-trained intensity value sections, and Q represents the number of segments of the intensity value sections.

In the present embodiment, the calculation formula for determining the rounded coherence value corresponding to the coherence value according to the coherence value, the pre-trained coherence value sections and the number of segments of the coherence value sections is as follows:

$$\begin{cases} 0, & coh < coh_1 \\ 1, & coh_1 < coh < coh_2 \\ & \cdot \\ & \cdot \\ & \cdot \\ C - 1, & coh > coh_{c-1} \end{cases}$$

In the formula, u represents the rounded coherence value, $coh_1$, $coh_2$, . . . $coh_{c-1}$, represents the pre-trained coherence value sections, and C represents the number of segments of the coherence value sections.

In the present embodiment, the calculation formula for determining the rounded angle value corresponding to the angle value according to the angle value and the number of segments of the angle value is as follows:

$$\text{theta} = \text{floor}(ang * P)$$

In the formula, theta represents the rounded angle value, floor represents round down, and P represents the number of segments of the angle value.

It should be noted that in the present embodiment, the pre-trained intensity value sections and the number of segments of the intensity value sections, as well as the pre-trained coherence value sections and the number of segments of the coherence value sections are obtained by performing down-sampling processing according to a large number of high-resolution pictures, so as to obtain a large number of low-resolution pictures, respectively sorting a large number of different intensity values and coherence values, which are calculated according to the large number of low-resolution pictures, and then taking values at intervals according to a preset number of section segments.

S307: performing calculation according to the rounded intensity value, the rounded coherence value and the rounded angle value, which correspond to each pixel in the low-resolution image, so as to obtain the hash value of each pixel in the low-resolution image.

Specifically, the hash value of each pixel in the low-resolution image is determined according to a product of the rounded angle value, the number of segments of the intensity value sections and the number of segments of the coherence value sections, a product of the rounded intensity value and the number of segments of the coherence value sections, and the rounded coherence value.

In the present embodiment, the calculation formula for determining the hash value of each pixel in the low-resolution image according to the product of the rounded angle value, the number of segments of the intensity value sections and the number of segments of the coherence value sections, the product of the rounded intensity value and the number of segments of the coherence value sections, and the rounded coherence value is as follows:

$$\text{hash} = \text{theta} * Q * C + \text{lambda} * C + u$$

In the formula, hash represents the hash value of the pixel in the low-resolution image; theta represents the rounded angle value; Q represents the number of segments of the intensity value sections; C represents the number of segments of the coherence value sections; lambda represents the rounded intensity value; and u represents the rounded coherence value.

As can be seen from the above description, the square region in the low-resolution image is determined, in which each pixel is centered and the pixel size is k*k; the pixel gradient value is calculated according to the square region; the pixel gradient matrix is constructed according to the pixel gradient value; the intensity value, the coherence value and the angle value of the pixel gradient matrix are obtained according to the pixel gradient value; and the hash value of each pixel in the low-resolution image is obtained according to the intensity value, the coherence value and the angle value of the pixel gradient matrix. In the present embodiment, the hash value is obtained by performing calculation on the low-resolution image, therefore compared with the prior art in which the hash value is calculated on a high-resolution image, the calculation mode provided in the present embodiment is lower in calculation amount and higher in calculation efficiency.

Referring to FIG. 4, FIG. 4 is a third schematic flowchart of an image processing method provided in an embodiment of the present disclosure. On the basis of the embodiment corresponding to FIG. 3, the present embodiment further provides a process of how to perform pre-training to obtain the pre-trained intensity value sections and the number of segments of the intensity value sections, as well as the pre-trained coherence value sections and the number of segments of the coherence value sections, which is specifically described in detail as follows:

S401: acquiring a plurality of high-resolution pictures, and performing down-sampling interpolation processing on the plurality of high-resolution pictures, so as to obtain a plurality of low-resolution pictures.

In the present embodiment, down-sampling interpolation processing is performed on the plurality of high-resolution pictures, the multiple of down-sampling interpolation is the same as the multiple of upper sampling from the low-resolution image to the high-resolution image as described above, for example, the value is s multiples.

S402: determining a square region on each low-resolution picture, in which each pixel is centered and the pixel size is k*k.

In the present embodiment, for each pixel in each low-resolution picture, the corresponding square region is determined, in which each pixel is centered and the pixel size is k*k.

S403: calculating a pixel gradient value of each pixel in the square region corresponding to each pixel on each low-resolution picture; generating a pixel gradient matrix according to the pixel gradient value of each pixel; calculating an eigenvalue of the pixel gradient matrix; and calculating an intensity value and a coherence value of the pixel gradient matrix according to the eigenvalue.

In the present embodiment, the calculation process of the present step is consistent with the calculation process of steps S302 to S305, specific reference may be made to the related description of steps S302 to S305, and thus details are not repeated here again.

S404: sorting a plurality of acquired intensity values in an ascending order, and taking values from the plurality of intensity values at intervals according to a preset number of segments of the intensity value sections, so as to obtain the pre-trained intensity value sections.

In the present embodiment, the plurality of intensity values are obtained by calculation in each square region on each low-resolution picture.

Here, it is assumed that the value of the preset number of segments of the intensity value sections is Q, values at Q, $1/Q$, $2/Q$, . . . , to $$\frac{Q-1}{Q}$$

are selected at an interval of $1/Q$ from the intensity values sorted in the ascending order, so as to obtain the pre-trained intensity value sections, which is denoted as $str_1$, $str_2$, . . . , $str_{q-1}$.

S405: sorting the plurality of acquired coherence values in the ascending order, and taking values from the plurality of coherence values at intervals according to a preset number of segments of the coherence value sections, so as to obtain the pre-trained coherence value sections.

In the present embodiment, the plurality of coherence values are obtained by calculation in each square region on each low-resolution picture.

Here, it is assumed that the value of the preset number of segments of the coherence value sections is C, values at $1/C$, $2/C$, . . . , to $$\frac{C-1}{C}$$

are selected at an interval of $1/C$ from the coherence values sorted in the ascending order, so as to obtain the pre-trained coherence value sections, which is denoted as $coh_1$, $coh_2$, . . . , $coh_{c-1}$.

As can be seen from the above description, by means of performing down-sampling interpolation processing on the large number of high-resolution pictures to obtain the large number of low-resolution pictures, respectively sorting a large number of different intensity values and coherence values obtained by calculation according to the large number of low-resolution pictures, and then taking values according to the preset number of segments of sections to obtain the pre-trained intensity value sections and the pre-trained coherence value sections, an accurate reference basis may be provided for subsequent rounding quantification processing on the intensity value, the coherence value and the angle value.

Referring to FIG. 5, FIG. 5 is a fourth schematic flowchart of an image processing method provided in an embodiment of the present disclosure. On the basis of any one of the embodiments corresponding to FIG. 1 to FIG. 4, the present embodiment further provides a process of how to construct the pre-stored correspondences between the hash values and the pre-trained filter banks, which will be specifically described in detail below:

S501: acquiring a plurality of high-resolution pictures, and performing down-sampling interpolation processing on the plurality of high-resolution pictures, so as to obtain a plurality of low-resolution pictures.

In the present embodiment, the down-sampling interpolation processing is performed on the plurality of high-resolution pictures, and the multiple of the down-sampling interpolation is the same as the multiple of the upper sampling from the low-resolution image to the high-resolution image, for example, the value is s multiples.

S502: determining each pixel in each low-resolution picture, and a plurality of target pixels in the high-resolution picture, which correspond to each pixel in each low-resolution picture.

In the present embodiment, during the process of performing down-sampling interpolation processing in step S501, down-sampling interpolation is performed on the plurality of target pixels in the high-resolution picture, so as to obtain one pixel in the low-resolution picture.

S503: calculating a hash value of a square region in the low-resolution picture, in which each pixel is centered and the pixel size is k*k, wherein k is an odd number greater than 1.

In the present embodiment, the calculation process of the present step is consistent with the calculation process in steps S301 to S307, specific reference may be made to the related description of steps S301 to S307, and thus details are not repeated here again.

S504: classifying, into a group, square region pixels having the same hash value and corresponding to the pixels in the low-resolution picture, and a plurality of target pixels in the corresponding high-resolution picture, so as to obtain m groups of square region pixels of the low-resolution pictures and the plurality of target pixels in the corresponding high-resolution pictures, wherein m is a positive integer.

In the present embodiment, the value of m may be adjusted according to the actual situation. Optionally, the value of m is greater than 100,000.

S505: performing a simultaneous matrix equation on the m groups of the square region pixels of the low-resolution pictures and the plurality of target pixels in the corresponding high-resolution pictures.

In one embodiment of the present disclosure, the matrix equation is:

$$PF = b$$

In the formula, P represents each square region pixel in the low-resolution picture, and the matrix size of which is m rows and k*k columns; F represents a filter bank of which the matrix size is 1 row and s*s columns; b represents s*s target pixels on the high-resolution picture, wherein s represents the multiple of down-sampling interpolation.

S506: solving the filter banks in the m groups of matrix equations, so as to obtain the filter bank corresponding to each hash value.

In the present embodiment, the matrix equation PF=b corresponding to any hash value is solved by using a least square method, so as to obtain the filter bank corresponding to the any hash value: $F=(P^T P)^{-1} P^T b$.

As can be seen from the above description, by means of performing down-sampling interpolation processing on the filter banks corresponding to different hash values according to a large number of high-resolution pictures, so as to obtain a large number of low-resolution pictures; and then, using the large number of high-resolution pictures and the corresponding low-resolution pictures as training data sets, and using the low-resolution pictures as input and the high-resolution pictures as output to solve the corresponding filter banks, the filter banks corresponding to different hash values may be accurately and quickly obtained in the present embodiment, so that the accuracy and the processing efficiency are improved.

Figure 6:
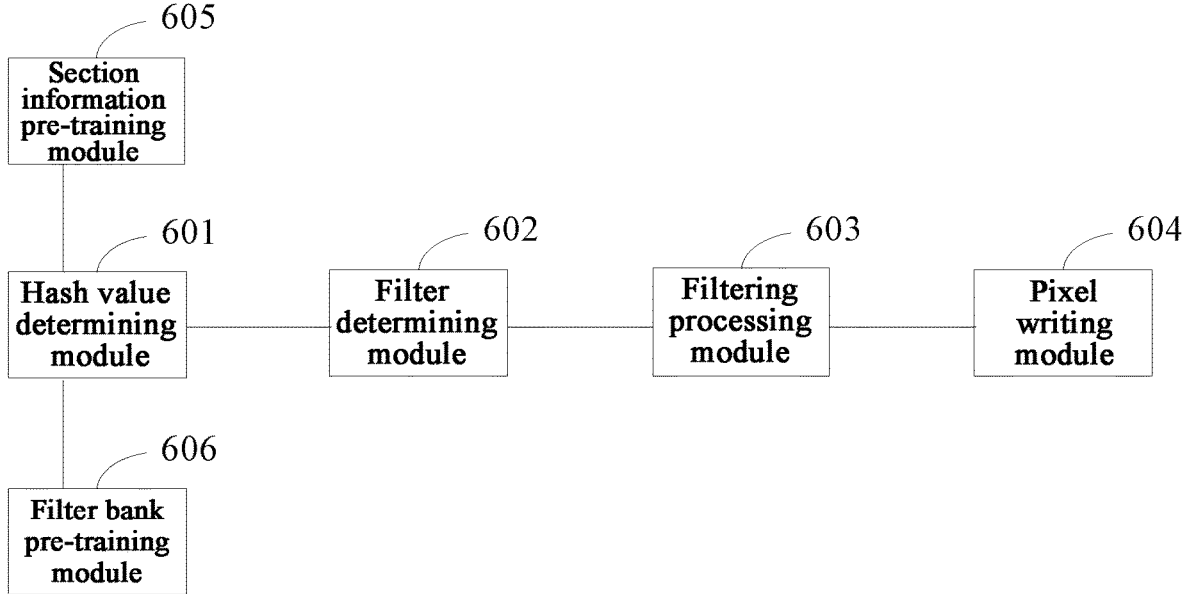
FIG. 6 is a structural block diagram of an image processing unit provided in an embodiment of the present disclosure.

Corresponding to the image processing method in the above embodiments, FIG. 6 is a structural block diagram of an image processing unit provided in an embodiment of the present disclosure. For ease of description, only parts related to the embodiments of the present disclosure are shown. Referring to FIG. 6, the apparatus includes a hash value determining module 601, a filter determining module 602, a filtering processing module 603 and a pixel writing module 604.

The hash value determining module 601 is configured to acquire a low-resolution image, and calculate a hash value of each pixel in the low-resolution image;

the filter determining module 602 is configured to query a pre-stored corresponding relationship between hash values and pre-trained filter banks, so as to obtain a filter bank corresponding to the hash value of each pixel, wherein the filter bank includes a plurality of filters;

the filtering processing module 603 is configured to respectively filter a pixel region corresponding to each pixel according to each filter in the filter bank, so as to obtain a plurality of filtered pixel values; and the pixel writing module 604 is configured to respectively write the plurality of filtered pixel values into corresponding coordinate positions of a high-resolution image, so as to obtain the high-resolution image corresponding to the low-resolution image.

According to one or more embodiments of the present disclosure, the hash value determining module 601 is specifically configured to determine a square region in the low-resolution image, in which each pixel is centered and the pixel size is k*k, wherein k is an odd number greater than 1; calculate a pixel gradient value of each pixel in the square region; generate a pixel gradient matrix according to the pixel gradient value of each pixel in the square region; calculate an eigenvalue of the pixel gradient matrix; calculate an intensity value, a coherence value and an angle value of the pixel gradient matrix according to the eigenvalue; perform rounding quantization processing on the intensity value, the coherence value and the angle value, so as to obtain a rounded intensity value, a rounded coherence value and a rounded angle value; and perform calculation according to the rounded intensity value, the rounded coherence value and the rounded angle value, which correspond to each pixel in the low-resolution image, so as to obtain the hash value of each pixel in the low-resolution image.

According to one or more embodiments of the present disclosure, the hash value determining module 601 is specifically configured to calculate the pixel gradient value of the square region in the following manner: respectively calculating a first pixel gradient in the horizontal direction of each pixel in the square region, and a second pixel gradient in the vertical direction; correspondingly, generating the pixel gradient matrix according to the pixel gradient value of each pixel in the square region includes: constructing a 2*2 pixel gradient matrix according to the pixel gradient value of each pixel in the square region, wherein the first element in the 2*2 pixel gradient matrix is equal to the quadratic sum of the first pixel gradients of the pixels in the horizontal direction, the second element and the third element are equal to the sum of products of the first pixel gradients of the pixels in the horizontal direction and the second pixel gradients in the vertical direction, and the fourth element is equal to the quadratic sum of the second pixel gradients of the pixels in the vertical direction; correspondingly, calculating the eigenvalue of the pixel gradient matrix includes: calculating the eigenvalue of the 2*2 pixel gradient matrix to obtain a first eigenvalue and a second eigenvalue of the 2*2 pixel gradient matrix; and correspondingly, calculating the intensity value, the coherence value and the angle value of the pixel gradient matrix according to the eigenvalue includes: calculating the intensity value according to the first eigenvalue; calculating the coherence value according to the first eigenvalue and the second eigenvalue; and calculating an eigenvector corresponding to the first eigenvalue, and calculating the angle value according to the eigenvector.

According to one or more embodiments of the present disclosure, the hash value determining module 601 is specifically configured to perform the rounding quantization processing on the intensity value, the coherence value and the angle value, so as to obtain the rounded intensity value, the rounded coherence value and the rounded angle value in the following manner: determining the rounded intensity value corresponding to the intensity value according to the intensity value, pre-trained intensity value sections, and the number of segments of the intensity value sections; determining the rounded coherence value corresponding to the coherence value according to the coherence value, pre-trained coherence value sections, and the number of segments of the coherence value sections; and determining the rounded angle value corresponding to the angle value according to the angle value and the number of segments of the angle value.

According to one or more embodiments of the present disclosure, the hash value determining module 601 is specifically configured to perform calculation according to the rounded intensity value, the rounded coherence value and the rounded angle value, which correspond to each pixel in the low-resolution image, so as to obtain the hash value of each pixel in the low-resolution image in the following manner: determining the hash value of each pixel in the low-resolution image according to a product of the rounded angle value, the number of segments of the intensity value sections and the number of segments of the coherence value sections, a product of the rounded intensity value and the number of segments of the coherence value sections, and the rounded coherence value.

According to one or more embodiments of the present disclosure, the apparatus further includes: a section information pre-training module 605, configured to acquire a plurality of high-resolution pictures, and perform down-sampling interpolation processing on the plurality of high-resolution pictures, so as to obtain a plurality of low-resolution pictures; determine a square region on each low-resolution picture, in which each pixel is centered, and the pixel size is k*k; calculate a pixel gradient value of each pixel in the square region corresponding to each pixel on each low-resolution picture; generate a pixel gradient matrix according to the pixel gradient value of each pixel; calculate an eigenvalue of the pixel gradient matrix; calculate an intensity value and a coherence value of the pixel gradient matrix according to the eigenvalue; sort a plurality of acquired intensity values in an ascending order, and take values from the plurality of intensity values at intervals according to a preset number of segments of the intensity value sections, so as to obtain the pre-trained intensity value sections; and sort the plurality of acquired coherence values in the ascending order, and take values from the plurality of coherence values at intervals according to a preset number of segments of the coherence value sections, so as to obtain the pre-trained coherence value sections.

According to one or more embodiments of the present disclosure, the apparatus further includes: a filter bank pre-training module 606, configured to acquire a plurality of high-resolution pictures, and perform down-sampling interpolation processing on the plurality of high-resolution pictures, so as to obtain a plurality of low-resolution pictures; determine each pixel in each low-resolution picture, and a plurality of target pixels in the high-resolution picture, which correspond to each pixel in each low-resolution picture; calculate a hash value of a square region in the low-resolution picture, in which each pixel is centered and the pixel size is k*k, wherein k is an odd number greater than 1; classify, into a group, square region pixels having the same hash value and corresponding to the pixels in the low-resolution picture, and a plurality of target pixels in the corresponding high-resolution picture, so as to obtain m groups of square region pixels of the low-resolution pictures and the plurality of target pixels in the corresponding high-resolution pictures, wherein m is a positive integer; perform a simultaneous matrix equation on the m groups of square region pixels of the low-resolution pictures and the plurality of target pixels in the corresponding high-resolution pictures; solve the filter banks in the m groups of matrix equations, so as to obtain the filter bank corresponding to each hash value.

The apparatus provided in the present embodiment may be used to perform the technical solutions of the above method embodiments, and the implementation principles and technical effects thereof are similar, thus details are not described herein again.

In order to implement the above embodiments, an embodiment of the present disclosure further provide an electronic device.

Figure 7:
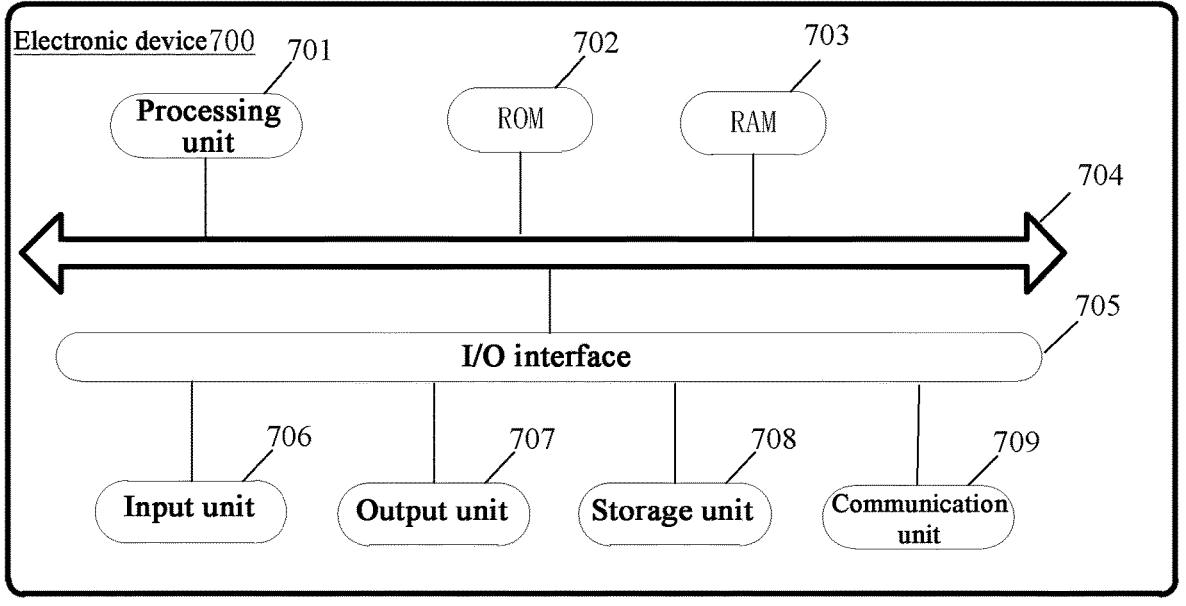
FIG. 7 is a schematic diagram of a hardware structure of an electronic device provided in an embodiment of the present disclosure.

Referring to FIG. 7, it illustrates a schematic structural diagram of an electronic device 700 suitable for implementing the embodiments of the present disclosure. The electronic device 700 may be a terminal device or a server. The terminal device may include, but is not limited to, mobile terminals such as mobile phones, notebook computers, digital broadcast receivers, PDAs, portable Android devices (PADs for short), portable media players (PMPs for short), vehicle-mounted terminals (e.g., vehicle-mounted navigation terminals), and the like, and fixed terminals such as digital TVs, desktop computers, and the like. The electronic device shown in FIG. 7 is merely an example, and should not bring any limitation to the functions and use ranges of the embodiments of the present disclosure.

As shown in FIG. 7, the electronic device 700 may include a processing unit (e.g., a central processing unit, a graphics processing unit, or the like) 701, which may perform various suitable actions and processes in accordance with a program stored in a read only memory (ROM for short) 702 or a program loaded from a storage unit 708 into a random access memory (RAM for short) 703. In the RAM 703, various programs and data needed by the operations of the electronic device 700 are also stored. The processing unit 701, the ROM 702 and the RAM 703 are connected to each other via a bus 704. An input/output (I/O for short) interface 705 is also connected to the bus 704.

In general, the following apparatuses may be connected to the I/O interface 705: an input unit 706, including, for example, a touch screen, a touch pad, a keyboard, a mouse, a camera, a microphone, an accelerometer, a gyroscope, and the like; an output unit 707, including, for example, a liquid crystal display (LCD for short), a speaker, a vibrator, and the like; a storage unit 708, including, for example, a magnetic tape, a hard disk, and the like; and a communication unit 709. The communication unit 709 may allow the electronic device 700 to communicate in a wireless or wired manner with other devices to exchange data. Although FIG. 7 illustrates the electronic device 700 having various apparatuses, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a computer-readable medium, and the computer program contains program codes for performing the method illustrated in the flowcharts. In such embodiments, the computer program may be downloaded and installed from a network via the communication unit 709, or installed from the storage unit 708, or installed from the ROM 702. When the computer program is executed by the processing unit 701, the above functions defined in the method of the embodiments of the present disclosure are performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, an RAM, an ROM, an erasable programmable read only memory (EPROM for short or flash memory), an optical fiber, a portable compact disc read only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is propagated in a baseband or as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, radio frequency (RF for short), and the like, or any suitable combination thereof.

The computer-readable medium may be contained in the above electronic device; and it may also be present separately and is not assembled into the electronic device.

The computer-readable medium carries one or more programs that, when executed by the electronic device, cause the electronic device to execute the method shown in the above embodiments.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN for short) or a wide area network (WAN for short), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the order annotated in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case. For example, a first acquisition unit may also be described as "a unit for acquiring at least two Internet Protocol addresses".

The functions described herein above may be performed, at least in part, by one or more hardware logic components. For example, without limitation, example types of the hardware logic components that may be used include: a field programmable gate array (FPGA for short), an application specific integrated circuit (ASIC for short), an application specific standard product (ASSP for short), a system on chip (SOC for short), a complex programmable logic device (CPLD for short), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, an RAM, an ROM, an EPROM or a flash memory, an optical fiber, a CD-ROM, an optical storage device, a magnetic storage device, or any suitable combination thereof.

In a first aspect, according to one or more embodiments of the present disclosure, provided is an image processing method, including:

acquiring a low-resolution image, and calculating a hash value of each pixel in the low-resolution image;

querying pre-stored correspondences between hash values and pre-trained filter banks, so as to obtain a filter bank corresponding to the hash value of each pixel, wherein the filter bank includes a plurality of filters;

respectively filtering a pixel region corresponding to each pixel according to each filter in the filter bank, so as to obtain a plurality of filtered pixel values; and respectively writing the plurality of filtered pixel values into corresponding coordinate positions of a high-resolution image, so as to obtain the high-resolution image corresponding to the low-resolution image.

According to one or more embodiments of the present disclosure, calculating the hash value of each pixel in the low-resolution image includes: determining a square region in the low-resolution image, in which each pixel is centered and the pixel size is k*k, wherein k is an odd number greater than 1; calculating a pixel gradient value of each pixel in the square region; generating a pixel gradient matrix according to the pixel gradient value of each pixel in the square region; calculating an eigenvalue of the pixel gradient matrix; calculating an intensity value, a coherence value and an angle value of the pixel gradient matrix according to the eigenvalue; performing rounding quantization processing on the intensity value, the coherence value and the angle value, so as to obtain a rounded intensity value, a rounded coherence value and a rounded angle value; and performing calculation according to the rounded intensity value, the rounded coherence value and the rounded angle value, which correspond to each pixel in the low-resolution image, so as to obtain the hash value of each pixel in the low-resolution image.

According to one or more embodiments of the present disclosure, calculating the pixel gradient value of the square region, and generating the pixel gradient matrix according to the pixel gradient value of each pixel in the square region, includes: respectively calculating a first pixel gradient of each pixel in the square region in the horizontal direction, and a second pixel gradient in the vertical direction; and constructing a 2*2 pixel gradient matrix according to the pixel gradient value of each pixel in the square region, wherein the first element in the 2*2 pixel gradient matrix is equal to the quadratic sum of the first pixel gradients of the pixels in the horizontal direction, the second element and the third element are equal to the sum of products of the first pixel gradients of the pixels in the horizontal direction and the second pixel gradients in the vertical direction, and the fourth element is equal to the quadratic sum of the second pixel gradients of the pixels in the vertical direction.

According to one or more embodiments of the present disclosure, calculating the eigenvalue of the pixel gradient matrix includes: calculating the eigenvalue of the 2*2 pixel gradient matrix to obtain a first eigenvalue and a second eigenvalue of the 2*2 pixel gradient matrix.

According to one or more embodiments of the present disclosure, calculating the intensity value, the coherence value and the angle value of the pixel gradient matrix according to the eigenvalue includes: calculating the intensity value according to the first eigenvalue; calculating the coherence value according to the first eigenvalue and the second eigenvalue; and calculating an eigenvector corresponding to the first eigenvalue, and calculating the angle value according to the eigenvector.

According to one or more embodiments of the present disclosure, performing rounding quantization processing on the intensity value, the coherence value and the angle value, so as to obtain the rounded intensity value, the rounded coherence value and the rounded angle value, includes: determining the rounded intensity value corresponding to the intensity value according to the intensity value, pre-trained intensity value sections, and the number of segments of the intensity value sections; determining the rounded coherence value corresponding to the coherence value according to the coherence value, pre-trained coherence value sections, and the number of segments of the coherence value sections; and determining the rounded angle value corresponding to the angle value according to the angle value and the number of segments of the angle value.

According to one or more embodiments of the present disclosure, performing calculation according to the rounded intensity value, the rounded coherence value and the rounded angle value, which correspond to each pixel in the low-resolution image, so as to obtain the hash value of each pixel in the low-resolution image, includes: determining the hash value of each pixel in the low-resolution image according to a product of the rounded angle value, the number of segments of the intensity value sections and the number of segments of the coherence value sections, a product of the rounded intensity value and the number of segments of the coherence value sections, and the rounded coherence value.

According to one or more embodiments of the present disclosure, the method further includes: acquiring a plurality of high-resolution pictures, and performing down-sampling interpolation processing on the plurality of high-resolution pictures, so as to obtain a plurality of low-resolution pictures; determining a square region on each low-resolution picture, in which each pixel is centered and the pixel size is k*k; calculating a pixel gradient value of each pixel in the square region corresponding to each pixel on each low-resolution picture; generating a pixel gradient matrix according to the pixel gradient value of each pixel; calculating an eigenvalue of the pixel gradient matrix; calculating an intensity value and a coherence value of the pixel gradient matrix according to the eigenvalue; sorting a plurality of acquired intensity values in an ascending order, and taking values from the plurality of intensity values at intervals according to a preset number of segments of the intensity value sections, so as to obtain the pre-trained intensity value sections; and sorting the plurality of acquired coherence values in the ascending order, and taking values from the plurality of coherence values at intervals according to a preset number of segments of the coherence value sections, so as to obtain the pre-trained coherence value sections.

According to one or more embodiments of the present disclosure, the method further includes: acquiring a plurality of high-resolution pictures, and performing down-sampling interpolation processing on the plurality of high-resolution pictures, so as to obtain a plurality of low-resolution pictures; determining each pixel in each low-resolution picture, and a plurality of target pixels in the high-resolution picture, which correspond to each pixel in each low-resolution picture; calculating a hash value of a square region in the low-resolution picture, in which each pixel is centered and the pixel size is k*k, wherein k is an odd number greater than 1; classifying, into a group, square region pixels having the same hash value and corresponding to the pixels in the low-resolution picture, and a plurality of target pixels in the corresponding high-resolution picture, so as to obtain m groups of square region pixels of the low-resolution pictures and the plurality of target pixels in the corresponding high-resolution pictures, wherein m is a positive integer; performing a simultaneous matrix equation on the m groups of the square region pixels of the low-resolution pictures and the plurality of target pixels in the corresponding high-resolution pictures; and solving the filter banks in the m groups of matrix equations, so as to obtain the filter bank corresponding to each hash value.

According to one or more embodiments of the present disclosure, the matrix equation is:

$$PF = b$$

in the formula, P represents each square region pixel in the low-resolution picture, and the matrix size of which is m rows and k*k columns; F represents a filter bank of which the matrix size is 1 row and s*s columns; b represents s*s target pixels on the high-resolution picture, wherein s represents the multiple of down-sampling interpolation In a second aspect, according to one or more embodiments of the present disclosure, provided is an image processing unit, including:

a hash value determining module, configured to acquire a low-resolution image, and calculate a hash value of each pixel in the low-resolution image;

a filter determining module, configured to query pre-stored correspondences between hash values and pre-trained filter banks, so as to obtain a filter bank corresponding to the hash value of each pixel, wherein the filter bank includes a plurality of filters;

a filtering processing module, configured to respectively filter a pixel region corresponding to each pixel according to each filter in the filter bank, so as to obtain a plurality of filtered pixel values; and a pixel writing module, configured to respectively write the plurality of filtered pixel values into corresponding coordinate positions of a high-resolution image, so as to obtain the high-resolution image corresponding to the low-resolution image.

According to one or more embodiments of the present disclosure, the hash value determining module is specifically configured to determine a square region in the low-resolution image, in which each pixel is centered and the pixel size is k*k, wherein k is an odd number greater than 1; calculate a pixel gradient value of each pixel in the square region; generate a pixel gradient matrix according to the pixel gradient value of each pixel in the square region; calculate an eigenvalue of the pixel gradient matrix; calculate an intensity value, a coherence value and an angle value of the pixel gradient matrix according to the eigenvalue; perform rounding quantization processing on the intensity value, the coherence value and the angle value, so as to obtain a rounded intensity value, a rounded coherence value and a rounded angle value; and perform calculation according to the rounded intensity value, the rounded coherence value and the rounded angle value, which correspond to each pixel in the low-resolution image, so as to obtain the hash value of each pixel in the low-resolution image.

According to one or more embodiments of the present disclosure, the hash value determining module is specifically configured to calculate the pixel gradient value of the square region in the following manner: respectively calculating a first pixel gradient of each pixel in the square region in the horizontal direction, and a second pixel gradient in the vertical direction; correspondingly, generating the pixel gradient matrix according to the pixel gradient value of each pixel in the square region includes: constructing a 2*2 pixel gradient matrix according to the pixel gradient value of each pixel in the square region, wherein the first element in the 2*2 pixel gradient matrix is equal to the quadratic sum of the first pixel gradients of the pixels in the horizontal direction, the second element and the third element are equal to the sum of products of the first pixel gradients of the pixels in the horizontal direction and the second pixel gradients in the vertical direction, and the fourth element is equal to the quadratic sum of the second pixel gradients of the pixels in the vertical direction; correspondingly, calculating the eigenvalue of the pixel gradient matrix includes: calculating the eigenvalue of the 2*2 pixel gradient matrix to obtain a first eigenvalue and a second eigenvalue of the 2*2 pixel gradient matrix; and correspondingly, calculating the intensity value, the coherence value and the angle value of the pixel gradient matrix according to the eigenvalue includes: calculating the intensity value according to the first eigenvalue; calculating the coherence value according to the first eigenvalue and the second eigenvalue; and calculating an eigenvector corresponding to the first eigenvalue, and calculating the angle value according to the eigenvector.

According to one or more embodiments of the present disclosure, the hash value determining module is specifically configured to perform the rounding quantization processing on the intensity value, the coherence value and the angle value, so as to obtain the rounded intensity value, the rounded coherence value and the rounded angle value in the following manner: determining the rounded intensity value corresponding to the intensity value according to the intensity value, pre-trained intensity value sections, and the number of segments of the intensity value sections; determining the rounded coherence value corresponding to the coherence value according to the coherence value, pre-trained coherence value sections, and the number of segments of the coherence value sections; and determining the rounded angle value corresponding to the angle value according to the angle value and the number of segments of the angle value.

According to one or more embodiments of the present disclosure, the hash value determining module is specifically configured to perform calculation according to the rounded intensity value, the rounded coherence value and the rounded angle value, which correspond to each pixel in the low-resolution image, so as to obtain the hash value of each pixel in the low-resolution image in the following manner: determining the hash value of each pixel in the low-resolution image according to a product of the rounded angle value, the number of segments of the intensity value sections and the number of segments of the coherence value sections, a product of the rounded intensity value and the number of segments of the coherence value sections, and the rounded coherence value.

According to one or more embodiments of the present disclosure, the apparatus further includes: a section information pre-training module, configured to acquire a plurality of high-resolution pictures, and perform down-sampling interpolation processing on the plurality of high-resolution pictures, so as to obtain a plurality of low-resolution pictures; determine a square region on each low-resolution picture, in which each pixel is centered and the pixel size is k*k; calculate a pixel gradient value of each pixel in the square region corresponding to each pixel on each low-resolution picture; generate a pixel gradient matrix according to the pixel gradient value of each pixel; calculate an eigenvalue of the pixel gradient matrix; calculate an intensity value and a coherence value of the pixel gradient matrix according to the eigenvalue; sort a plurality of acquired intensity values in an ascending order, and take values from the plurality of intensity values at intervals according to a preset number of segments of the intensity value sections, so as to obtain the pre-trained intensity value sections; and sort the plurality of acquired coherence values in the ascending order, and take values from the plurality of coherence values at intervals according to a preset number of segments of the coherence value sections, so as to obtain the pre-trained coherence value sections.

According to one or more embodiments of the present disclosure, the apparatus further includes: a filter bank pre-training module, configured to acquire a plurality of high-resolution pictures, and perform down-sampling interpolation processing on the plurality of high-resolution pictures, so as to obtain a plurality of low-resolution pictures; determine each pixel in each low-resolution picture, and a plurality of target pixels in the high-resolution picture, which correspond to each pixel in each low-resolution picture; calculate a hash value of a square region in the low-resolution picture, in which each pixel is centered and the pixel size is k*k, wherein k is an odd number greater than 1; classify, into a group, square region pixels having the same hash value and corresponding to the pixels in the low-resolution picture, and a plurality of target pixels in the corresponding high-resolution picture, so as to obtain m groups of square region pixels of the low-resolution pictures and the plurality of target pixels in the corresponding high-resolution pictures, wherein m is a positive integer; perform a simultaneous matrix equation on the m groups of the square region pixels of the low-resolution pictures and the plurality of target pixels in the corresponding high-resolution pictures; solve the filter banks in the m groups of matrix equations, so as to obtain the filter bank corresponding to each hash value.

In a third aspect, according to one or more embodiments of the present disclosure, provided is an electronic device, including: at least one processor and a memory;

the memory stores a computer execution instruction; and the at least one processor executes the computer execution instruction stored in the memory, so that the at least one processor implements the image processing method in the first aspect and various possible designs of the first aspect.

In a fourth aspect, according to one or more embodiments of the present disclosure, provided is a computer-readable storage medium, wherein a computer execution instruction is stored in the computer-readable storage medium, and when executing the computer execution instruction, a processor implements the image processing method in the first aspect and various possible designs of the first aspect.

In a fifth aspect, according to one or more embodiments of the present disclosure, provided is a computer program product, including a computer program, wherein when executed by a processor, the computer program implements the image processing method in the first aspect and various possible designs of the first aspect.

In a sixth aspect, according to one or more embodiments of the present disclosure, provided is a computer program, wherein when executed by a processor, the computer program implements the image processing method in the first aspect and various possible designs of the first aspect.

What have been described above are only preferred embodiments of the present disclosure and illustrations of the technical principles employed. It will be appreciated by those skilled in the art that the disclosure scope involved in the embodiments of the preset disclosure is not limited to the technical solutions formed by specific combinations of the above technical features, and meanwhile should also include other technical solutions formed by any combinations of the above technical features or equivalent features thereof without departing from the concept of the disclosure, for example, technical solutions formed by mutual replacement of the above features with technical features having similar functions disclosed in the present disclosure (but is not limited to).

In addition, although various operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it should be understood that the theme defined in the appended claims is not necessarily limited to the specific features or actions described above. Rather, the specific features and actions described above are merely example forms of implementing the claims.

We claim:

1. An image processing method, comprising:
   acquiring a low-resolution image, and calculating a hash value of each pixel in the low-resolution image;
   querying pre-stored correspondences between hash values and pre-trained filter banks, to obtain a filter bank corresponding to the hash value of each pixel, wherein the filter bank comprises a plurality of filters;
   filtering a pixel region corresponding to each pixel according to each filter in the filter bank respectively, to obtain a plurality of filtered pixel values;
   writing the plurality of filtered pixel values into corresponding coordinate positions of a high-resolution image respectively, to obtain the high-resolution image corresponding to the low-resolution image;
   wherein the method further comprises:
   acquiring a plurality of high-resolution pictures, and performing down-sampling interpolation processing on the plurality of high-resolution pictures, to obtain a plurality of low-resolution pictures;
   determining each pixel in each low-resolution picture, and a plurality of target pixels in the high-resolution picture, which correspond to each pixel in each low-resolution picture;

calculating a hash value of a square region in the low-resolution picture, in which each pixel is centered and the pixel size is k*k, wherein k is an odd number greater than 1;
   classifying, into a group, square region pixels having the same hash value and corresponding to the pixels in the low-resolution picture, and a plurality of target pixels in the corresponding high-resolution picture, to obtain m groups of square region pixels of the low-resolution pictures and the plurality of target pixels in the corresponding high-resolution pictures, wherein m is a positive integer;
   performing a simultaneous matrix equation on the m groups of the square region pixels of the low-resolution pictures and the plurality of target pixels in the corresponding high-resolution pictures; and
   solving the filter banks in the m groups of matrix equations to obtain the filter bank corresponding to each hash value.

2. The method according to claim 1, wherein calculating the hash value of each pixel in the low-resolution image comprises:
   determining a square region in the low-resolution image, in which each pixel is centered and the pixel size is k*k, wherein k is an odd number greater than 1;
   calculating a pixel gradient value of each pixel in the square region;
   generating a pixel gradient matrix according to the pixel gradient value of each pixel in the square region;
   calculating an eigenvalue of the pixel gradient matrix;
   calculating an intensity value, a coherence value and an angle value of the pixel gradient matrix according to the eigenvalue;
   performing rounding quantization processing on the intensity value, the coherence value and the angle value, to obtain a rounded intensity value, a rounded coherence value and a rounded angle value; and
   performing calculation according to the rounded intensity value, the rounded coherence value and the rounded angle value, which correspond to each pixel in the low-resolution image, to obtain the hash value of each pixel in the low-resolution image.

3. The method according to claim 2, wherein calculating the pixel gradient value of the square region, and generating the pixel gradient matrix according to the pixel gradient value of each pixel in the square region, comprises:
   calculating a first pixel gradient in the horizontal direction of each pixel in the square region, and a second pixel gradient in the vertical direction, respectively; and
   constructing a 2*2 pixel gradient matrix according to the pixel gradient value of each pixel in the square region, wherein a first element in the 2*2 pixel gradient matrix is equal to a quadratic sum of the first pixel gradients of the pixels in the horizontal direction, a second element and a third element are equal to a sum of products of the first pixel gradients of the pixels in the horizontal direction and the second pixel gradients in the vertical direction, and a fourth element is equal to a quadratic sum of the second pixel gradients of the pixels in the vertical direction.

4. The method according to claim 3, wherein calculating the eigenvalue of the pixel gradient matrix comprises:
   calculating the eigenvalue of the 2*2 pixel gradient matrix to obtain a first eigenvalue and a second eigenvalue of the 2*2 pixel gradient matrix.

5. The method according to claim 4, wherein calculating the intensity value, the coherence value and the angle value of the pixel gradient matrix according to the eigenvalue comprises:

calculating the intensity value according to the first eigenvalue;

calculating the coherence value according to the first eigenvalue and the second eigenvalue; and calculating an eigenvector corresponding to the first eigenvalue, and calculating the angle value according to the eigenvector.

6. The method according to claim 2, wherein performing rounding quantization processing on the intensity value, the coherence value and the angle value, to obtain the rounded intensity value, the rounded coherence value and the rounded angle value, comprises:

determining the rounded intensity value corresponding to the intensity value according to the intensity value, pre-trained intensity value sections, and a number of segments of the intensity value sections;

determining the rounded coherence value corresponding to the coherence value according to the coherence value, pre-trained coherence value sections, and a number of segments of the coherence value sections; and determining the rounded angle value corresponding to the angle value according to the angle value and a number of segments of the angle value.

7. The method according to claim 6, wherein performing calculation according to the rounded intensity value, the rounded coherence value and the rounded angle value, which correspond to each pixel in the low-resolution image, to obtain the hash value of each pixel in the low-resolution image, comprises:

determining the hash value of each pixel in the low-resolution image according to a product of the rounded angle value, the number of segments of the intensity value sections and the number of segments of the coherence value sections, a product of the rounded intensity value and the number of segments of the coherence value sections, and the rounded coherence value.

8. The method according to claim 6, wherein the method further comprises:

acquiring a plurality of high-resolution pictures, and performing down-sampling interpolation processing on the plurality of high-resolution pictures, to obtain a plurality of low-resolution pictures;

determining a square region on each low-resolution picture, in which each pixel is centered and the pixel size is k*k;

calculating a pixel gradient value of each pixel in the square region corresponding to each pixel on each low-resolution picture; generating a pixel gradient matrix according to the pixel gradient value of each pixel; calculating an eigenvalue of the pixel gradient matrix; calculating an intensity value and a coherence value of the pixel gradient matrix according to the eigenvalue;

sorting a plurality of acquired intensity values in an ascending order, and taking values from the plurality of intensity values at intervals according to a preset number of segments of the intensity value sections, to obtain the pre-trained intensity value sections; and sorting the plurality of acquired coherence values in the ascending order, and taking values from the plurality of coherence values at intervals according to a preset number of segments of the coherence value sections, to obtain the pre-trained coherence value sections.

9. The method according to claim 1, wherein the matrix equation is:

$$PF = b$$

in the formula, P represents each square region pixel in the low-resolution picture, and the matrix size of which is m rows and k*k columns; F represents a filter bank of which the matrix size is 1 row and s*s columns; and b represents s*s target pixels on the high-resolution picture, wherein s represents the multiple of down-sampling interpolation.

10. An electronic device, comprising: a processor and a memory;

the memory stores a computer execution instruction; and the processor executes the computer execution instruction stored in the memory, so that the processor performs operations comprising:

acquiring a low-resolution image, and calculating a hash value of each pixel in the low-resolution image;

querying pre-stored correspondences between hash values and pre-trained filter banks, to obtain a filter bank corresponding to the hash value of each pixel, wherein the filter bank comprises a plurality of filters;

filtering a pixel region corresponding to each pixel according to each filter in the filter bank respectively, to obtain a plurality of filtered pixel values;

writing the plurality of filtered pixel values into corresponding coordinate positions of a high-resolution image respectively, to obtain the high-resolution image corresponding to the low-resolution image;

wherein the operations further comprise:

acquiring a plurality of high-resolution pictures, and performing down-sampling interpolation processing on the plurality of high-resolution pictures, to obtain a plurality of low-resolution pictures;

determining each pixel in each low-resolution picture, and a plurality of target pixels in the high-resolution picture, which correspond to each pixel in each low-resolution picture;

calculating a hash value of a square region in the low-resolution picture, in which each pixel is centered and the pixel size is k*k, wherein k is an odd number greater than 1;

classifying, into a group, square region pixels having the same hash value and corresponding to the pixels in the low-resolution picture, and a plurality of target pixels in the corresponding high-resolution picture, to obtain m groups of square region pixels of the low-resolution pictures and the plurality of target pixels in the corresponding high-resolution pictures, wherein m is a positive integer;

performing a simultaneous matrix equation on the m groups of the square region pixels of the low-resolution pictures and the plurality of target pixels in the corresponding high-resolution pictures; and solving the filter banks in the m groups of matrix equations to obtain the filter bank corresponding to each hash value.

11. The electronic device according to claim 10, wherein calculating the hash value of each pixel in the low-resolution image comprises:

determining a square region in the low-resolution image, in which each pixel is centered and the pixel size is k*k, wherein k is an odd number greater than 1;

calculating a pixel gradient value of each pixel in the square region;

generating a pixel gradient matrix according to the pixel gradient value of each pixel in the square region;

calculating an eigenvalue of the pixel gradient matrix;

calculating an intensity value, a coherence value and an angle value of the pixel gradient matrix according to the eigenvalue;

performing rounding quantization processing on the intensity value, the coherence value and the angle value, to obtain a rounded intensity value, a rounded coherence value and a rounded angle value; and performing calculation according to the rounded intensity value, the rounded coherence value and the rounded angle value, which correspond to each pixel in the low-resolution image, to obtain the hash value of each pixel in the low-resolution image.

12. The electronic device according to claim 11, wherein calculating the pixel gradient value of the square region, and generating the pixel gradient matrix according to the pixel gradient value of each pixel in the square region, comprises:

calculating a first pixel gradient in the horizontal direction of each pixel in the square region, and a second pixel gradient in the vertical direction, respectively; and constructing a 2*2 pixel gradient matrix according to the pixel gradient value of each pixel in the square region, wherein a first element in the 2*2 pixel gradient matrix is equal to a quadratic sum of the first pixel gradients of the pixels in the horizontal direction, a second element and a third element are equal to a sum of products of the first pixel gradients of the pixels in the horizontal direction and the second pixel gradients in the vertical direction, and a fourth element is equal to a quadratic sum of the second pixel gradients of the pixels in the vertical direction.

13. The electronic device according to claim 11, wherein performing rounding quantization processing on the intensity value, the coherence value and the angle value, to obtain the rounded intensity value, the rounded coherence value and the rounded angle value, comprises:

determining the rounded intensity value corresponding to the intensity value according to the intensity value, pre-trained intensity value sections, and a number of segments of the intensity value sections;

determining the rounded coherence value corresponding to the coherence value according to the coherence value, pre-trained coherence value sections, and a number of segments of the coherence value sections; and determining the rounded angle value corresponding to the angle value according to the angle value and a number of segments of the angle value.

14. A non-transitory computer-readable storage medium, wherein a computer execution instruction is stored in the computer-readable storage medium, and when executing the computer execution instruction, a processor performs operations comprising:

acquiring a low-resolution image, and calculating a hash value of each pixel in the low-resolution image;

querying pre-stored correspondences between hash values and pre-trained filter banks, to obtain a filter bank corresponding to the hash value of each pixel, wherein the filter bank comprises a plurality of filters;

filtering a pixel region corresponding to each pixel according to each filter in the filter bank respectively, to obtain a plurality of filtered pixel values; and writing the plurality of filtered pixel values into corresponding coordinate positions of a high-resolution image respectively, to obtain the high-resolution image corresponding to the low-resolution image;

wherein the operations further comprise:

acquiring a plurality of high-resolution pictures, and performing down-sampling interpolation processing on the plurality of high-resolution pictures, to obtain a plurality of low-resolution pictures;

determining each pixel in each low-resolution picture, and a plurality of target pixels in the high-resolution picture, which correspond to each pixel in each low-resolution picture;

calculating a hash value of a square region in the low-resolution picture, in which each pixel is centered and the pixel size is k*k, wherein k is an odd number greater than 1;

classifying, into a group, square region pixels having the same hash value and corresponding to the pixels in the low-resolution picture, and a plurality of target pixels in the corresponding high-resolution picture, to obtain m groups of square region pixels of the low-resolution pictures and the plurality of target pixels in the corresponding high-resolution pictures, wherein m is a positive integer;

performing a simultaneous matrix equation on the m groups of the square region pixels of the low-resolution pictures and the plurality of target pixels in the corresponding high-resolution pictures; and solving the filter banks in the m groups of matrix equations to obtain the filter bank corresponding to each hash value.

15. The non-transitory computer-readable storage medium according to claim 13, wherein calculating the hash value of each pixel in the low-resolution image comprises:

determining a square region in the low-resolution image, in which each pixel is centered and the pixel size is k*k, wherein k is an odd number greater than 1;

calculating a pixel gradient value of each pixel in the square region;

generating a pixel gradient matrix according to the pixel gradient value of each pixel in the square region;

calculating an eigenvalue of the pixel gradient matrix;

calculating an intensity value, a coherence value and an angle value of the pixel gradient matrix according to the eigenvalue;

performing rounding quantization processing on the intensity value, the coherence value and the angle value, to obtain a rounded intensity value, a rounded coherence value and a rounded angle value; and performing calculation according to the rounded intensity value, the rounded coherence value and the rounded angle value, which correspond to each pixel in the low-resolution image, to obtain the hash value of each pixel in the low-resolution image.

16. The non-transitory computer-readable storage medium according to claim 15, wherein calculating the pixel gradient value of the square region, and generating the pixel gradient matrix according to the pixel gradient value of each pixel in the square region, comprises:

calculating a first pixel gradient in the horizontal direction of each pixel in the square region, and a second pixel gradient in the vertical direction, respectively; and constructing a 2*2 pixel gradient matrix according to the pixel gradient value of each pixel in the square region, wherein a first element in the 2*2 pixel gradient matrix is equal to a quadratic sum of the first pixel gradients of the pixels in the horizontal direction, a second element and a third element are equal to a sum of products of the first pixel gradients of the pixels in the horizontal direction and the second pixel gradients in the vertical direction, and a fourth element is equal to a quadratic sum of the second pixel gradients of the pixels in the vertical direction.

17. The non-transitory computer-readable storage medium according to claim 15, wherein performing rounding quantization processing on the intensity value, the coherence value and the angle value, to obtain the rounded intensity value, the rounded coherence value and the rounded angle value, comprises:

determining the rounded intensity value corresponding to the intensity value according to the intensity value, pre-trained intensity value sections, and a number of segments of the intensity value sections;

determining the rounded coherence value corresponding to the coherence value according to the coherence value, pre-trained coherence value sections, and a number of segments of the coherence value sections; and determining the rounded angle value corresponding to the angle value according to the angle value and a number of segments of the angle value.

* * * * *